US012681335B2

(12) United States Patent
Dag

(10) Patent No.: US 12,681,335 B2
(45) Date of Patent: Jul. 14, 2026

(54) EYEGLASSES FRAME AND EYEGLASSES

(71) Applicant: Ishan Dag, Vasteras (SE)

(72) Inventor: Ishan Dag, Vasteras (SE)

( * ) Notice: Subject to any disclaimer, the term of this patent is extended or adjusted under 35 U.S.C. 154(b) by 538 days.

(21) Appl. No.: 18/029,915

(22) PCT Filed: Sep. 28, 2021

(86) PCT No.: PCT/EP2021/076567

§ 371 (c)(1),
(2) Date: Apr. 2, 2023

(87) PCT Pub. No.: WO2022/089859

PCT Pub. Date: May 5, 2022

(65) Prior Publication Data

US 2024/0012272 A1     Jan. 11, 2024

(30) Foreign Application Priority Data

Oct. 27, 2020    (EP) ..................................... 20204044

(51) Int. Cl.
*G02C 9/02*          (2006.01)
*G02C 9/04*          (2006.01)

(52) U.S. Cl.
CPC ................. *G02C 9/02* (2013.01); *G02C 9/04* (2013.01); *G02C 2200/08* (2013.01)

(58) Field of Classification Search
CPC ........... G02C 9/00–04; G02C 2200/08; G02C 11/00; G02C 11/02; G02C 11/04; G02C 11/10
See application file for complete search history.

(56) References Cited

U.S. PATENT DOCUMENTS

| | | | |
|---|---|---|---|
| 3,752,567 A * | 8/1973 | Broadhurst | G02C 7/105 351/44 |
| 4,740,069 A | 4/1988 | Baum | |
| 4,812,031 A | 3/1989 | Evans | |
| 4,886,340 A | 12/1989 | Kanda | |
| 5,479,293 A | 12/1995 | Reed | |
| 5,526,178 A | 6/1996 | Goldstein | |
| 7,325,922 B2 * | 2/2008 | Spivey | G02C 9/00 351/159.04 |
| 7,762,661 B2 * | 7/2010 | Beasley | G02C 5/001 351/86 |
| 9,470,907 B2 * | 10/2016 | Esmaeili | G02C 5/20 |
| 9,606,374 B2 * | 3/2017 | Bush | G02C 9/02 |
| 2005/0200802 A1 | 9/2005 | Kidouchim | |
| 2014/0285763 A1 | 9/2014 | Bush | |

* cited by examiner

*Primary Examiner* — Nicholas R. Pasko

(57) ABSTRACT

An eyeglasses frame 1 is disclosed. The eyeglasses frame 1 comprises a front portion 2, a first and a second temple band 3, 4 connected to the front portion 2 and an attachment member 5 rotatably connected to the front portion 2 to rotate in relation to the front portion 2 around a first rotation axis x1 of the attachment member 5. The attachment member 5 comprises at least one receiving portion 6 configured to receive a user unit 7 to attach the user unit 7 to the attachment member 5 and to enable rotation of the user unit 7 in relation to the attachment member 5 around a second rotation axis x2. Additionally, eyeglasses 12 comprising an eyeglass frame 1 are disclosed.

6 Claims, 3 Drawing Sheets

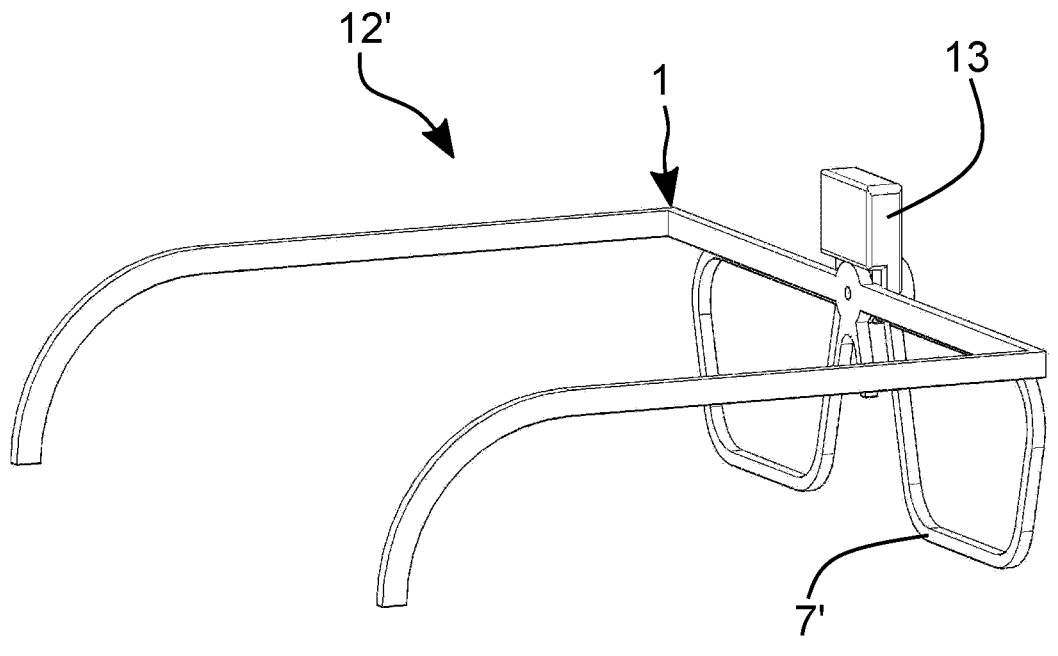
Fig. 5
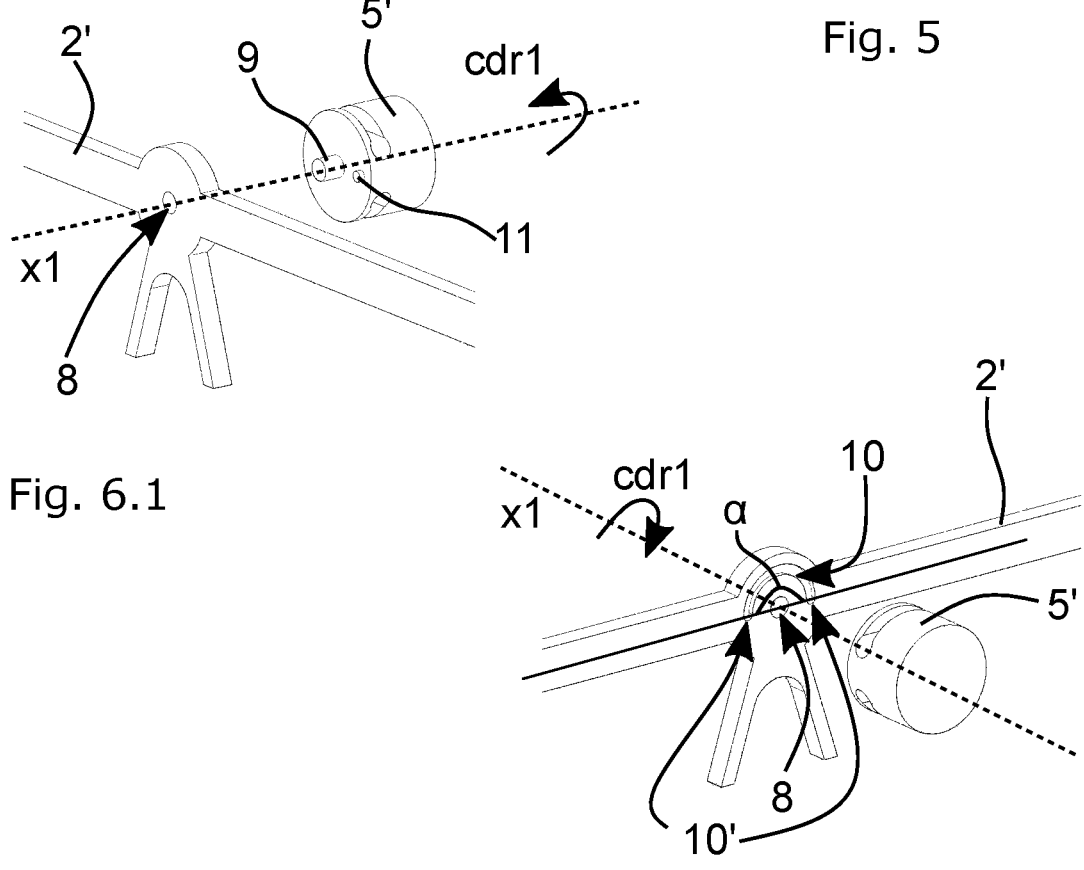
Fig. 6.1
Fig. 6.2

EYEGLASSES FRAME AND EYEGLASSES

BACKGROUND OF THE INVENTION AND PRIOR ART

The present disclosure relates to eyeglasses frames and to eyeglasses. Particularly, the present disclosure relates to an eyeglasses frame and to eyeglasses configured to enable, for a user, to change the application of the frame and of the eyeglasses.

Historically, persons having eye characteristics with a need of support by eyeglasses have often needed to use several pairs of eyeglasses with lenses adapted to the eye characteristics and adapted to different situations. For example, a user may have needed a pair of eyeglasses for daily use, a pair of glasses for reading, a pair of eyeglasses for driving and a pair of sunglasses.

Need of several eyeglasses is space consuming. Further, it is often difficult to remember the location of all the pairs of glasses at home. Yet further, need of several glasses may cause a loss of a pair or of several pairs or sometimes a pair may be forgotten to be bring with.

Efforts have been made to eliminate the need of multiple pair of eyeglasses and U.S. Pat. No. 6,918,667 is an example where common eyeglasses may be converted into sunglasses simply by attaching auxiliary glasses by means of magnets.

Although this prior art frame performs well, there is a need of an improved eyeglasses frame and improved eyeglasses enabling, for a user, to change the application of the frame and of the eyeglasses in a simple manner.

SUMMARY OF THE INVENTION

It is an object of the present disclosure to overcome or at least alleviate the above-mentioned drawbacks and problems. Thus, an object of the present disclosure is to provide an improved eyeglasses frame enabling, for a user, to change the application of the frame in a simple manner. Further, an object of the present disclosure is to provide eyeglasses frame that requires less space comparing to known solutions.

According to a first aspect of the disclosure, the object is achieved by a eyeglasses frame according to claim 1.

Thus, the object is achieved by an eyeglasses frame comprising:

a front portion, a first and a second temple band, connected to the front portion and an attachment member rotatably connected to the front portion to rotate in relation to the front portion around a first rotation axis of the attachment member. The attachment member comprises at least one receiving portion configured to receive a user unit to attach the user unit to the attachment member and to enable rotation of the user unit in relation to the attachment member around a second rotation axis.

Because the attachment member is rotatably connected to the front portion to rotate in relation to the front portion around the first rotation axis and the at least one receiving portion is configured to receive a user unit to attach the user unit to the attachment member and to enable rotation of the user unit in relation to the attachment member around the second rotation axis, the position of the user unit can be shifted simply by rotation of the attachment member around the first rotation axis and further by rotation if the user unit around the second rotation axis. Thereby a "turn-it" function is achieved which means that a user unit can be turned into a desired position of the user unit by being rotated with the attachment member around the first rotation axis and by being rotated around the second rotation axis. Thus, the user units can be positioned in front of the eyes of the user be being rotated with the attachment member around the first rotation axis or by being rotated around the second rotation axis. In a similar way a user unit can be positioned in a position not in front of the eyes of the user be being rotated with the attachment member around the first rotation axis or by being rotated around the second rotation axis.

Accordingly an improved eyeglasses frame is provided facilitating positioning of the user unit in a desired position. As a result, the above-mentioned object is achieved.

Optionally, the attachment member is connected to the front portion at a middle position of the front portion between the first and the second temple band. Thereby, the attachment member is connected at a center position of the front portion which implies that a user unit can be positioned symmetrically in relation to the eyeglasses frame.

Optionally, the second axis is perpendicular to the first axis.

Optionally, the attachment member comprises two receiving portions, arranged parallel to each other and opposite to each other in relation to the first axis. Thus, two user units can be attached to the attachment member, wherein each user unit can be attached to the attachment member by respective receiving portion. Further, the two user units can be rotated by rotating the attachment member around the first rotation axis in order to switch the position of the user units in front of the eyes of the user depending on needs of a user. Yet further, the user units can be folded together by being rotated within the respective receiving portion. Thus, less space is required for eyeglasses with user units in a folded state.

Optionally, the front portion or the attachment member comprises an aperture and respectively the attachment member or the front portion comprises a protrusion configured to be inserted into the aperture to rotatably connect the attachment member to the front portion. Thereby, a robust connection between the attachment member and the front portion is provided enabling rotation of the attachment member in relation to the front portion around the first rotation axis. Further, manufacturing costs of the eyeglasses frame can be kept low.

Optionally, the front portion or the attachment member comprises a rotation control portion configured to cooperate with a respective rotation control unit of the attachment member or of the front portion to control a rotational position of the attachment member in relation to the front portion during rotation around the first axis x. Thus, the position of the attachment member and thereby of the at least one user unit attached to the attachment member in relation to the front portion during rotation around the first rotation axis can be controlled thanks to the rotation control portion and the rotation control unit. The position of the attachment regarding the rotation around the first rotation axis can be controlled such as the attachment member can be lock in a desired position in relation to the front portion. Accordingly also a user unit can be lock in a desired position in relation to the front portion.

Optionally, the rotation control portion comprises a path and the rotation control unit is arranged to be positioned within the path and to follow the path during rotation of the attachment member in relation to the front portion around the first axis. The control unit may comprises a further protrusion configured to be positioned within the path. Thus, control of the rotational position of the attachment member in relation to the front portion during rotation around the first axis x can be achieved in a simple and reliable manner with low manufacturing costs.

Optionally, each of the at least one receiving portion comprises a depression, such as a groove. Thereby a robust and reliable receiving portion is achieved with low manufacturing costs.

Optionally, the user unit is selected from:

a unit comprising two lenses, a visor, a camera, a lamp or a safety- or filter glasses.

Further object of the present disclosure is to provide an improved eyeglasses. The object is achieved by eyeglasses comprising an eyeglasses frame according to any one of the embodiments described above.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which:

FIG. 5 illustrates eyeglasses with a user unit in form of a camera, FIG. 6.1 illustrates an enlarged cross sectional view of a rotation control unit of an attachment member according to some embodiments of the present disclosure and FIG. 6.2 illustrates an enlarged cross sectional view of a rotation control portion of the front portion rotation according to some embodiments of the present disclosure.

DETAILED DESCRIPTION OF PREFERRED.EMBODIMENTS OF THE INVENTION

Aspects of the present invention will now be described more fully. Like numbers refer to like elements throughout. Well-known functions or constructions will not necessarily be described in detail for brevity and/or clarity.

Figure 1:
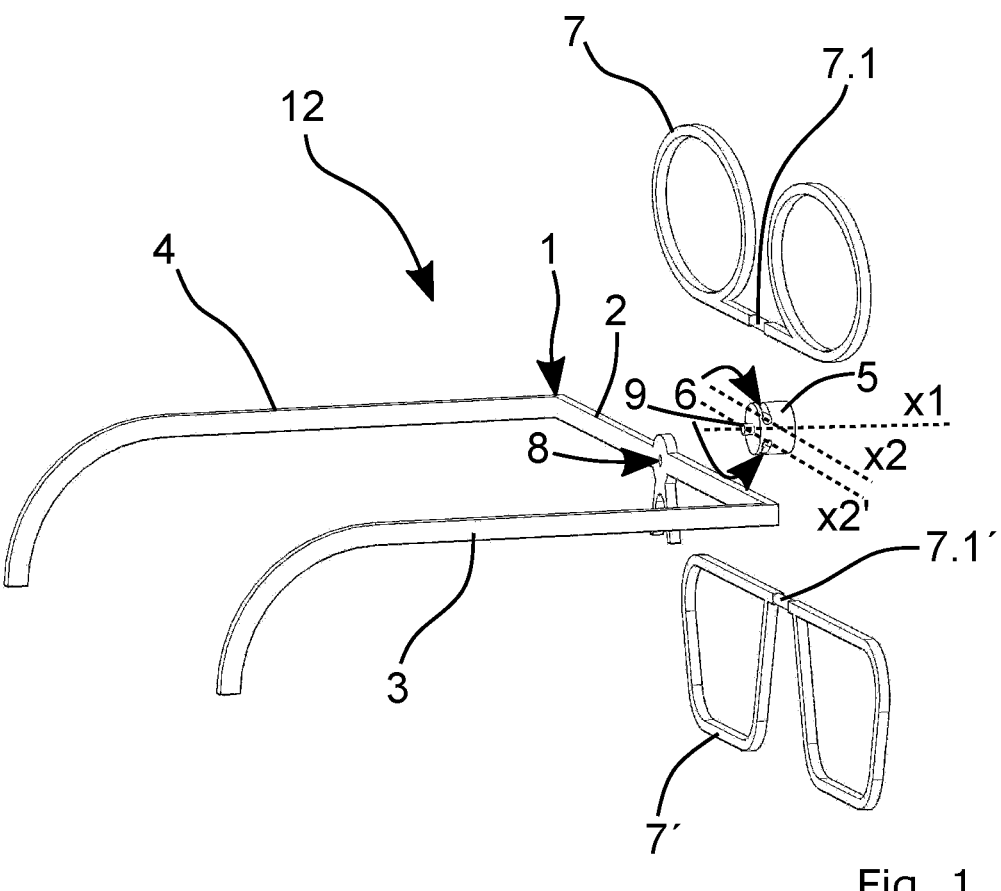
FIG. 1 illustrates an exploded view of eyeglasses according to some embodiments of the present disclosure.

FIG. 1 illustrates an exploded view of eyeglasses 12 according to some embodiments of the present disclosure. Eyeglasses 12 may also be called for eyewears or glasses. The eyeglasses 12 may be a specific type of eyeglasses, such as for example reading glasses, spectacles, goggles, sunglasses, farsighted, nearsighted or night driving glasses. The eyeglasses 12 comprises an eyeglasses frame 1 which eyeglass frame 1 comprises: a front portion 2, a first and a second temple band 3, 4 connected to the front portion 2 and an attachment member 5 rotatably connected to the front portion 2 to rotate in relation to the front portion 2 around a first rotation axis x1 of the attachment member 5.

The front portion 2, the first and the second temple bands 3, 4 and the attachment member 5 may be manufactured of a plastic material being the same for all the components. Alternatively the front portion 2, the first and the second temple bands 3, 4 and the attachment member 5 may be manufactured of different materials, such as a plastic material and a metal.

According to the embodiments illustrated in FIG. 1 the attachment member 5 comprises two receiving portions 6 configured to receive a first user unit 7 and a second user unit 7' to attach the user units 7, 7' to the attachment member 5 and to enable rotation of the user units 7, 7' in relation to the attachment member 5 around a second rotation axis x2 and around a further second rotation axis x2' respectively. The receiving portions 6 are arranged parallel to each other and opposite to each other in relation to the first axis x1.

As illustrated in FIG. 1, the user units 7, 7' are two pairs of glasses that may have different shapes and different lenses making the characteristics of each of the pair of glasses 7, 7' different. For example, the first user unit 7 may be reading glasses and the second user unit 7' may be eyeglasses for daily use.

Each of the receiving portion 6 comprises a depression, such as a groove 6. Thus, the grooves 6 enable that the user units 7, 7' can be received by the grooves 6 by inserting each user unit 7, 7' into respective groove 6.

The dimensions of the grooves 6 are adapted to dimensions of inserting portions 7.1, 7.1' of the first user unit 7 and of the second user unit 7'.

The inserting portions 7.1, 7.1' may be designed as elongated rods with diameter equal or greater than the inner diameter of the groves 6. The rod may be designed as a straight rod or a bend rod. Thereby, the user units 7, 7' may be inserted into the grooves 6 by pushing the inserting portions 7.1, 7.1' into the grooves 6. When the inserting portions 7.1, 7.1' has been inserted into the grooves 6 and being positioned within the grooves 6, the inserting portions 7.1, 7.1' and thereby the user units 7, 7' are hold in place within the grooves 6 thanks to friction forces between inner surfaces of the grooves 6 and outer surfaces of the inserting portions 7.1, 7.1'. Thus, the user units 7, 7' can rotate in relation to the attachment member 5 around the second rotation axis x2 and the further second rotation axis x2' respective. Further, the user units 7, 7' can be displaced in a direction coinciding with the second rotation axis x2 and the further second rotation axis x2' in order to adjust the position of the user units 7, 7' in relation to each other.

The grooves 6 and the inserting portions 7.1, 7.1' of the user units 7, 7' enable control of the rotational position of the user units 7, 7' around the second axis x2 and the further second axis x2' thanks to the friction forces created between the inner surfaces of the grooves 6 and an outer surfaces of the inserting portions 7.1, 7.1' after the user units 7, 7' have been positioned within the groves 6.

Optionally, the attachment member 5 may comprise one receiving portion 6, for example one grove 6. Thus, one user unit 7 may be attached to the attachment member 5. The user units 7, 7' may be selected from: a unit comprising two lenses, a visor, a camera, a lamp, a safety- or filter glasses or similar.

The attachment member 5 may be connected to the front portion 2 at a middle position of the front portion 2 between the first and the second temple band 3, 4. Thus, the middle position of the front portion is located at an equal distance from the first and the second temple bands 3, 4.

According to the embodiments illustrated in FIG. 1, the second axis x2 is perpendicular to the first axis x1.

The front portion 2 comprises an aperture 8 and the attachment member 5 comprises a protrusion 9 configured to be inserted into the aperture 8 to rotatably connect the attachment member 5 to the front portion 2. Optionally, the front portion 2 may comprise a protrusion and the attachment member 5 may comprise an aperture for a rotatable connection of the attachment member 5 with the front portion 2. The protrusion 9 may have a cylindrical form and the aperture 8 may have a circular form and being a through hole through the front portion 2.

The diameter of the protrusion 9 is adapted to the inner diameter of the aperture 8 such that the diameter of the protrusion 9 is equal or greater that the inner diameter of the aperture 8. Thus, a tight rotatable connection between the attachment member 5 and the front portion 2 is achieved after the protrusion 9 has been inserted into the aperture 8. The attachment member 5 is held in a desired position at the front portion 2 along the first axis x1 thanks to friction forces created between an outer surface of the protrusion 9 and an inner surface of the aperture 8 after the protrusion has been inserted into the aperture 8.

The protrusion 9 may comprise a cut enabling compression of the protrusion 9, which facilitates insertion of the protrusion 9 into the aperture 8 and causing that the protrusion can expand after being inserted into the aperture 8. The length of the protrusion measured along the first axis x1 is adapted to the wide of the front portion 2 and thereby to the deep of the aperture 8 such as the length of the protrusion may be equal the wide of the front portion to achieve a stable connection between the attachment member 5 and the front portion 2.

Further, as an alternative the attachment member 5 may be attached to the front portion 2 by means of a screw connection, a bolt connection or a similar suitable connection.

The protrusion 9 may be manufactured as an integral portion of the attachment member 5 and being manufactured of the same material, such as for example a plastic material. As an alternative the protrusion 9 may be manufactured as a separated unit of the same material as the attachment member 5 or of a different material, such as for example a metal, and being attached to the attachment member 5 by means of for example an adhesive.

Figure 2:
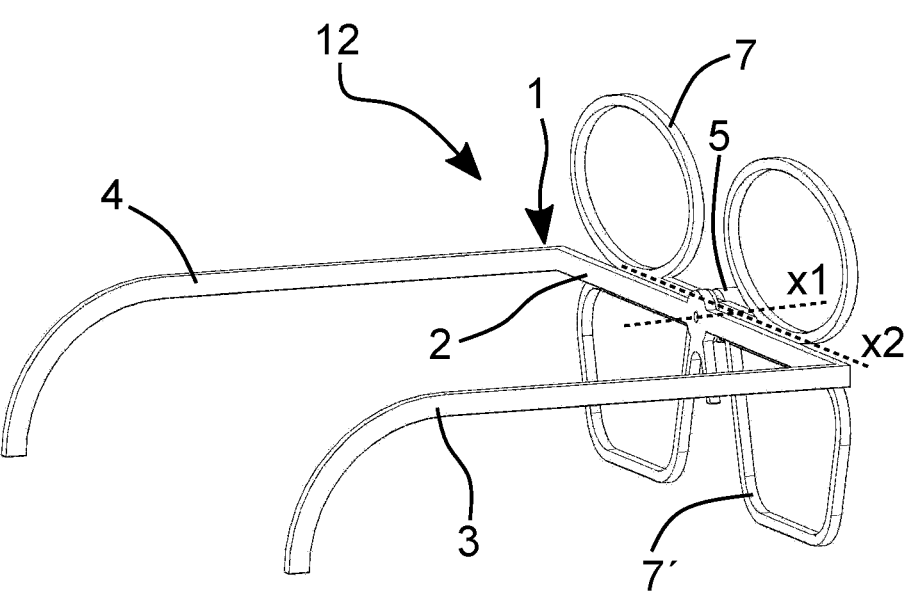
FIG. 2 illustrates assembled eyeglasses according to the embodiments illustrated in FIG. 1.

FIG. 2 illustrates assembled eyeglasses 12 according to the embodiments illustrated in FIG. 1. As can be seen, the protrusion 9 has been inserted into the aperture 8 to achieve a rotatable connection between the attachment member and the front portion 2.

When the attachment member 5 has been connected to the front portion 2 the attachment member 5 can rotate around the first rotation axis x1 to turn and switch the user units 7, 7' into a desired position for use by a user.

The user units 7, 7' can also rotate around the second rotation axis x2 and further second rotation axis x2' respectively. This is useful, for example when the first user unit 7 is a pair of sunglasses and the second user unit 7' is a pair of glasses for daily use. Then, the pair of sunglasses can be positioned in front of the pair of glasses for daily use simply by rotating of the pair of sunglasses around the second rotation axis x2.

The inserting portions 7.1 of the first user unit may be designed as a bend rod facilitating the positioning of the first user unit 7 in front of the second user unit by rotation around the second rotation axis x2. The inserting portions 7.1 may be bent in a way considering a distance between the groves 6 of the attachment member 5 and particularly considering a distance between the second rotation axis x2 and the further second rotation axis x2' which the distance may need to be taken into account for a positioning of the user unit 7 in front of the second user unit 7'.

Figure 3:
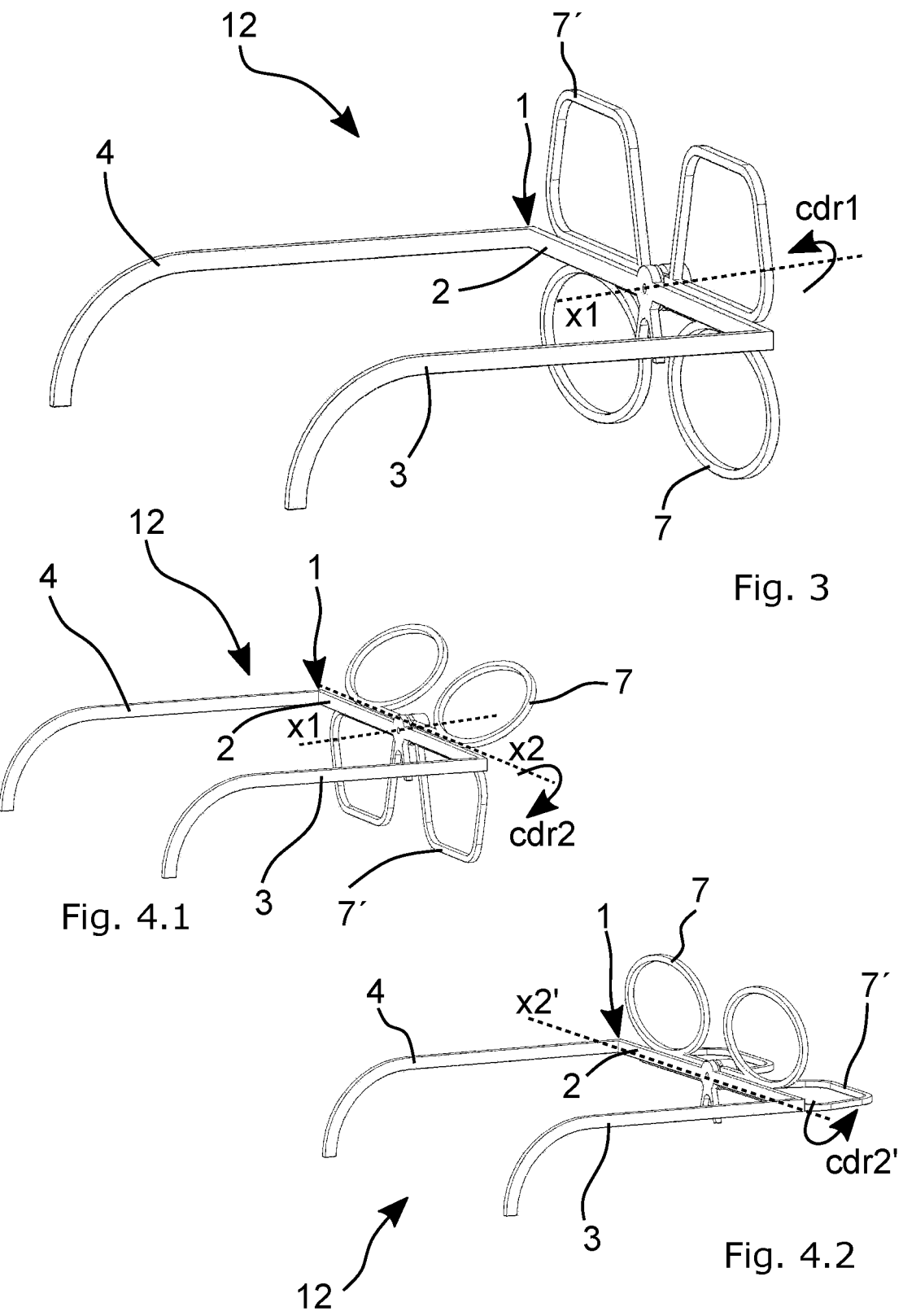
FIG. 3 illustrates eyeglasses illustrated in FIG. 2, where user units has been rotated around a first rotation axis, FIG. 4.1 illustrates eyeglasses illustrated in FIG. 1 and FIG. 2, where a first user unit has been rotated around a second rotation axis, FIG. 4.2 illustrates eyeglasses illustrated in FIG. 1 and FIG. 2, where a second user unit has been rotated around a further second rotation axis.

FIG. 3 illustrates eyeglasses 12 illustrated in FIG. 1 and FIG. 2 where the user units 7, 7' have been rotated around the first rotation axis x1 in a first circumferential direction cdr1. The first circumferential direction cdr1 can be a clockwise direction or a counter clockwise direction.

FIG. 4.1 illustrates eyeglasses12 illustrated in FIG. 1 and FIG. 2 where the first user unit 7 has been rotated around the second rotation axis x2 in a second circumferential direction cdr2. The second circumferential direction cdr2 can be a clockwise direction or a counter clockwise direction.

FIG. 4.2 illustrates eyeglasses12 illustrated in FIG. 1 and FIG. 2 where the second user unit 7' has been rotated around the further second rotation axis x2' in a further second circumferential direction cdr2'. Preferably, the further second circumferential direction cdr2' is a counter clockwise direction seen in the perspective of the FIG. 4.2. However, the second user unit 7' can be rotated in a clockwise direction seen in the perspective of the FIG. 4.2. Thus, the second user unit 7' can be angled upwards in a situation when the second user unit 7' is not needed to be positioned in front of the eyes of a user.

FIG. 5 illustrates eyeglasses 12' with an eyeglasses frame 1 according to the embodiments illustrated in FIG. 1-4, where the first user unit has been chosen to be a camera 13. Thus, the eyeglasses 12' with the camera 13 can be used for taking pictures or for video recording during use of the eyeglasses 12'. The camera 13 is only one example of a user unit that may be connected to the attachment member 5.

Other alternatives for the first and/or second user unit 7, 7' are, for example: a unit comprising two lenses, a visor, a lamp, a safety- or filter glasses or similar.

In the case when a visor has been connected to the attachment member 5, the eyeglasses frame 1 and the eyeglasses according to present invention can be used as a personal protection for reduction of the spread of diseases through bacteria or virus, such as Covid-19.

FIG. 6.1 illustrates an enlarged cross sectional view of a rotation control unit 11 of an attachment member 5' and FIG. 6.2 illustrates an enlarged cross sectional view of a rotation control portion 10 of the front portion 2'.

According to the embodiments illustrated in FIG. 6.1 and FIG. 6.2, the attachment member 5' comprises the rotational control unit 11 configured to cooperate with the rotation control portion 10 of the front portion 2'.

The rotation control unit 11 comprises a rotation control protrusion 11, such as a cylindrical protrusion 11 and the rotation control portion 10 comprises a path 10. Thus the rotation control protrusion 11 can be inserted into the path 10 when the attachment member 5' has been connected to the front portion 2'. The path 10 extends along a circumferential direction around the first rotation axis x1, and have a circular form with an angle α of, preferably 180°, the angle α being measured between lines through path end portions 10' of the path 10.

Thus, the rotation control unit 11 of the attachment member 5' can be positioned within the path 10 and to follow the path 10 during rotation of the attachment member 5' in relation to the front portion 2' around the first axis x1 to control a rotational position of the attachment member 5' in relation to the front portion 2 during rotation around the first axis x1.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. An eyeglasses frame (1) comprising:

a front portion (2), a first and a second temple band (3, 4) connected to the front portion (2) such that the front portion (2) extends between the first and second temple band (3, 4), a detachable first user unit (7), a detachable second user unit (7') separate from the first user unit (7), the second user unit (7') comprising two lenses fixedly connected to a frame of the second user unit (7'), and an attachment member (5) rotatably connected to the front portion (2) to rotate in relation to the front portion (2) around a first rotation axis (x1) of the attachment member (5), the first rotation axis (x1) extending in a direction perpendicular to a surface of the front portion, wherein the attachment member (5) comprises two receiving portions (6) formed on opposite sides of the attachment member in relation to the first rotation axis (x1), wherein each receiving portion (6) comprises a groove arranged to receive an inserting portion (7.1, 7.1') of the first user unit (7) or the second user unit (7'), to attach the first user unit and the second user unit (7, 7') to the attachment member (5) and to enable rotation of the first user unit (7) and the second user unit (7') in relation to the attachment member (5) around a second rotation axis (x2) perpendicular to the first rotation axis (x1), and wherein the attachment member (5) is rotatably connected to the front portion (2) at a middle position of the front portion (2) between the first and the second temple band (3, 4) to rotate both of the first user unit (7) and the second user unit (7') in relation to the front portion (2) about the first rotation axis (x1).

2. The eyeglasses frame (1) according to claim 1, wherein the front portion (2) comprises an aperture (8) and the attachment member (5) comprises a protrusion (9) configured to be inserted into the aperture (8) to rotatably connect the attachment member (5) to the front portion (2), or the attachment member (5) comprises an aperture (8) and the front portion (2) comprises a protrusion (9) configured to be inserted into the aperture (8) to rotatably connect the attachment member (5) to the front portion (2).

3. The eyeglasses frame (1) according to claim 1, wherein the front portion (2) comprises a rotation control portion (10) configured to cooperate with a rotation control unit (11) of the attachment member (5) to control a rotational position of the attachment member (5) in relation to the front portion (2) during rotation around the first axis (x1) or the attachment member (5) comprises a rotation control portion (10) configured to cooperate with a rotation control unit (11) of the front portion (2) to control a rotational position of the attachment member (5) in relation to the front portion (2) during rotation around the first axis (x1).

4. The eyeglasses frame (1) according to claim 3, wherein the rotation control portion (10) comprises a groove and the rotation control unit (11) is arranged to be positioned within the groove and to follow the groove during rotation of the attachment member (5) in relation to the front portion (2) around the first axis (x1).

5. The eyeglasses frame (1) according to claim 1, wherein the first user unit (7) is selected from:

a unit comprising two lenses connected by a frame, a visor, a camera, or a lamp.

6. Eyeglasses (12) comprising an eyeglasses frame (1) according to claim 1.

* * * * *